United States Patent
Clements et al.

(10) Patent No.: US 11,208,706 B2
(45) Date of Patent: Dec. 28, 2021

(54) SYSTEM AND METHOD OF HIGH PRESSURE OXY-FIRED (HIPROX) FLASH METALLIZATION

(71) Applicant: HER MAJESTY THE QUEEN IN RIGHT OF CANADA AS REPRESENTED BY THE MINISTER OF NATURAL RESOURCES, Ottawa (CA)

(72) Inventors: Bruce Clements, Nepean (CA); Mohammad Sameer Asiri, Ottawa (CA); Marc Alexander Duchesne, Kanata (CA); Robin William Hughes, Ottawa (CA)

(73) Assignee: HER MAJESTY THE QUEEN IN RIGHT OF CANADA AS REPRESENTED BY THE MINISTER OF NATURAL RESOURCES, Ottawa (CA)

(*) Notice: Subject to any disclaimer, the term of this patent is extended or adjusted under 35 U.S.C. 154(b) by 50 days.

(21) Appl. No.: 16/095,726

(22) PCT Filed: Apr. 26, 2017

(86) PCT No.: PCT/CA2017/050510
§ 371 (c)(1),
(2) Date: Oct. 23, 2018

(87) PCT Pub. No.: WO2017/185178
PCT Pub. Date: Nov. 2, 2017

(65) Prior Publication Data
US 2019/0368003 A1  Dec. 5, 2019

Related U.S. Application Data

(60) Provisional application No. 62/327,610, filed on Apr. 26, 2016.

(51) Int. Cl.
*C22B 5/12* (2006.01)

(52) U.S. Cl.
CPC .................................. *C22B 5/12* (2013.01)

(58) Field of Classification Search
CPC .................................. C22B 5/12; C22B 5/14
(Continued)

(56) References Cited

U.S. PATENT DOCUMENTS

| 3,767,379 A | * 10/1973 | Marion | C01B 3/36 |
| | | | 75/464 |
| 5,407,179 A | 4/1995 | Whipp | |

FOREIGN PATENT DOCUMENTS

| CA | 2340191 | 3/1998 |
| CA | 2440243 | 2/2002 |
| GB | 1045602 | 10/1964 |

OTHER PUBLICATIONS

International Search Report and Written Opinion for PCT/CA2017/050510 dated Aug. 4, 2017.

* cited by examiner

*Primary Examiner* — Weiping Zhu
(74) *Attorney, Agent, or Firm* — Daniel J. Chalker; Edwin S. Flores; Chalker Flores, LLP

(57) ABSTRACT

The present invention discloses a system and method for using a pressurized oxy-fired configuration to conduct metal reduction. The invention discloses a process for production of metal from metal oxide ore through reduction, comprising: (a) feeding a mixture of metal oxide ore, fuel and supply of oxygen into the inlet of a metallization reactor, (b) heating the mixture of metal oxide ore, oxygen and fuel in a primary reduction zone of the metallization reactor at a pressure exceeding ambient pressure to produce a product mixture;
(Continued)

and (c) separating the product mixture in a gas separation unit at the bottom or downstream of the metallization reactor.

20 Claims, 3 Drawing Sheets

(58) Field of Classification Search
USPC .......................................................... 75/707
See application file for complete search history.

SYSTEM AND METHOD OF HIGH PRESSURE OXY-FIRED (HIPROX) FLASH METALLIZATION

CROSS-REFERENCE TO RELATED APPLICATIONS

This application is a U.S. National Stage Application of and claims priority to International Application No. PCT/CA2017/050510, filed on Apr. 26, 2017, which claims priority to U.S. Provisional Application No. 62/327,610, filed on Apr. 26, 2016. The contents of foregoing applications are hereby incorporated by reference in their entirety.

FIELD OF THE INVENTION

The present invention relates generally to metal reduction, more specifically, a system and method for using a pressurized oxy-fired configuration to conduct the reduction reaction.

BACKGROUND OF THE INVENTION

Metal ore bodies are formed by a variety of geological processes; and are geologically deposited in the form of oxides, sulfides, carbonates or hydrates. These metal ores must be first refined in order to extract the metals of interest. Once the metallic ore is refined, there are usually thermal processing steps required to produce a pure form or the actual metal itself. Oxide ores are thermally reduced to remove the oxide leaving metallic product. Usually, a reducing gas in the form of a mixture of CO and $H_2$ is used to metallize ores. Examples of typical ore bodies that fit these criteria are iron, nickel, copper, tungsten, molybdenum, germanium and rhenium.

For example, in the case of iron oxides, the route of the main chemical reaction producing the molten iron is done by increasing the reduction states of iron oxides:

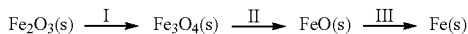

These successive reduction reactions can take place in both CO and $H_2$ atmospheres. $H_2$ is known to be a stronger reductant than CO.

With CO, the overall reaction is as follows:

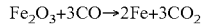

There are also analogous reactions with $H_2$:

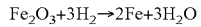

Ores that produce iron are usually found in the form of mixtures of wustite (FeO), magnetite ($Fe_3O_4$), and hematite ($Fe_2O_3$). There are a number of other ores that also contain iron including goethite, limonite, taconite, ilmenite and siderite that can also be used.

In the production of iron, pelletized iron ore or lump iron ore are placed in a blast furnace where the oxide is treated with a reduced gas in the form of CO and $H_2$ that chemically and thermally removes the oxygen resulting in the formation of $CO_2$ and $H_2O$ in addition to the pure metallic iron (Fe).

In the blast furnace process, the reducing gases are formed from the gasification of coal-derived coke. In addition to iron pellets and coke, flux materials may be used within the blast furnace to assist in the separation of the liquid metal from the slag/gangue.

This blast furnace route has provided the basic technology pathway for the production of high quality iron that is the essential ingredient in steels. This known technology has not changed substantially over the years.

Low efficiencies are associated with the existing blast furnace iron making processes due to multiple low efficiency steps. There are higher efficiency Direct Reduced Iron (DRI) processes that also produce iron in the form of sponge iron. The quality of these DRI processes however tends to be lower than the traditional blast furnace processes. Iron produced in this manner tends to carry higher impurities and be generally of lower quality than blast furnace iron. Some of this is linked to the liquid metals produced in a blast furnace that allow impurities to separate to the slag layer and be subsequently removed. DRI processes do not bring the metal all the way to liquid and therefore the slag and iron are not separated and this takes increased processing. DRI can be further refined using electric arc furnace (EAF) processing steps. Many steel products do not require high purity iron and therefore there is a substantial market for DRI. There are several processes used to produce DRI including Midrex™, Fastmelt™, etc. A DRI type approach that improves upon the iron quality is certainly a worthy goal.

Among the problems with the traditional blast furnace approaches to steel-making include the repeated low efficiency thermal processing steps required, and the large equipment sizes required to complete the reaction of iron oxides to metallic iron. These thermal processing steps include:

In the pelletization process, fine concentrated iron ore is formed into a suitable (common size and strength) for use in a packed bed reaction vessel such as a blast furnace. The pelletization step requires heating to 1200-1300° C. to produce a pellet with suitable handling characteristics. The pellets are typically cooled after treatment for shipment to the blast furnace. The energy intensity for the production of pelletized ores is approximately 5 430 MJ/t Fe.

In the coking process, metallurgical coal is converted to coke so that it is suitable (common size, strength and chemical reduction characteristics) for use within a blast furnace. It involves the thermal distillation of coal at high temperatures in the absence of air in coke oven batteries.

Feed material to the sintering process includes ore fines, coke, reverts (including blast furnace dust, mill scale, and other by-products of steelmaking), recycled hot and cold fines from the sintering process, and trim materials (e.g., limestone, calcite fines, and other supplemental materials needed to produce a sinter product with prescribed chemistry and tonnage). The product is a hard-fused material called sinter that is suitable for charging to the blast furnace.

The blast furnace step is where coke, iron ore pellets and flux (e.g., limestone) are processed to produce liquid iron. Coke is converted to a gas capable of reducing the iron oxides (FeO, $Fe_2O_3$, $Fe_3O_4$) to metallic iron typically called pig iron or hot metal. This gas contains high partial pressures of $H_2$ and CO that form the major reductant species. The large, refractory-lined furnace is charged through its top with iron ore pellets, sinter, flux (limestone and dolomite), and coke, which provides the fuel and forms a reducing atmosphere in the furnace. Many modern blast furnaces also inject pulverized coal or other sources of carbon to reduce the quantity of coke required. Iron oxides, coke, coal, and fluxes react with the heated blast air injected near the bottom of the furnace to form molten reduced iron, carbon monoxide (CO), hydrogen ($H_2$) and slag. The molten iron and slag collect in the hearth at the base of the furnace and are periodically removed from the furnace ("tapping"). The blast furnace gas (BFG) is collected at the top of the furnace and is recovered for use as fuel in the blast furnace stoves and other parts of the steel plant. The vast majority of greenhouse gases ($CO_2$) are emitted from the blast furnaces' stove stacks where the combustion gases from the stoves are discharged.

The basic oxygen furnace step is used to improve the chemistry of the liquid iron. The energy intensity of this operation combined with the blast furnace step is 21 050 MJ/t Fe.

Liquid iron is often formed into pigs or ingots that require reheating for every subsequent transformation or processing step.

Many of these thermal processing steps have extremely low efficiencies, in the range of 20% to 60%. In a series of operations such as iron making, each with low efficiency, the overall result is a process with very low efficiency.

There are many commercial DRI processes that are widely used throughout the world to produce metallic iron, also termed as sponge iron, and due to the improved energy efficiency of these processes they emit 40-60% less $CO_2$ than conventional blast furnace approaches. One disadvantage associated with the current DRI systems is that the sponge iron produced from these systems tends to have higher levels of impurities, as much as 5% gangue. Most DRI pathways are also not scaled to the production levels that blast furnace production facilities are scaled to. This results in an efficiency loss due to product quality and scale of economy.

Therefore, there remains the need to improve the efficiency and quality of the metallization processes, including reducing or eliminating some of the processing steps while maintaining or improving product quality.

SUMMARY OF THE INVENTION

The process disclosed herein provides an alternate pathway to produce metallic iron. This pathway combines or eliminates process steps that include coke making, pellet production, sintering and iron production and as such takes several thermal processes with low thermal efficiencies and combines them into a single processing step resulting in high energy efficiency.

Pressurized conditions promote many of the key conditions that are available in the blast furnace and improve upon many of these in a manner that are favorable in the production of high quality iron. This production route is also strongly synergistic with polygeneration (co-production of iron, power and chemicals) as well as providing a technology pathway towards carbon capture and storage as a greenhouse gas control measure.

Pressurized processing reduces the size of associated equipment by largely increasing reaction rates and residence times. Pressurized processing further provides a pathway to $CO_2$ concentration by concentrating the flue stream due to oxy-firing and then providing the exhaust stream at pressurized conditions to either eliminate or reduce the energy intensive compression steps required for sequestration.

The pressurized process, inter alia, offers the following:
Increased operating pressure
Increased partial pressure of reducing gases (CO and $H_2$)
Increasing the water shift reaction thereby increasing the amount of $H_2$ as the most powerful reduction species
Ability to control metallization temperature
Increased surface area of metal oxides
Use of endothermic chemical reactions for moderation of flame temperature
Supplying chemistry suitable to lower ash viscosity making it more easily removed from
a gasification or combustion chamber Some of the advantages associated with using a pressurized system include the following:
Reduced equipment sizes and capital costs
Increased partial pressure of reductant species
Increase heat and mass transfer rate
Produce a pressurized and concentrated CO2 stream for capture and storage
Produce high calorific value top gas at pressure
Remove processing steps in the production of hot metal
Increase the potential for the removal of pollutant species from flue streams According to one aspect of the invention, it is provided a process for production of metal from metal oxide ore through reduction, comprising:
(a) feeding a mixture of metal oxide ore, fuel and supply of oxygen into the inlet of a metallization reactor;
(b) heating the mixture of metal oxide ore, oxygen and fuel in the metallization reactor at a pressure exceeding ambient pressure to produce a product mixture; and
(c) separating the product gas mixture in a gas separation unit at the bottom or downstream of the metallization reactor.

Optionally, the process further comprise a step of injecting at least one of water, fluxant and recycled off-gas to the mixture of metal oxide ore, fuel and oxygen into the inlet of a metallization reactor during step (a). Preferably, the fluxant is alkali material, and preferably limestone or dolomite.

Preferably, the reaction temperature of step (b) is between 1000 to 2000° C., more preferably between 1500 to 2000° C., and even more preferably between 1550-1600° C.

Preferably, in step (b) the metallization reactor is at a pressure of 1 to 100 barg, and preferably at 10-30 barg.

Preferably, the metal oxide ore is pulverized.

Preferably, the fuel used in step (a) comprises of natural gas, coal, oil and/or hydrogen.

Preferably, the process further comprises a step where product gas is recovered from the metallization reactor; and the recovered gas is recycled or used to provide heat elsewhere in the process.

Other features and advantages of the present invention will become apparent from the following detailed description and the accompanying drawings, which illustrate, by way of example, the principles of the invention.

BRIEF DESCRIPTION OF THE DRAWINGS

The invention will now be described with reference to the drawings, in which.

DETAILED DESCRIPTION OF THE INVENTION

Figure 1:
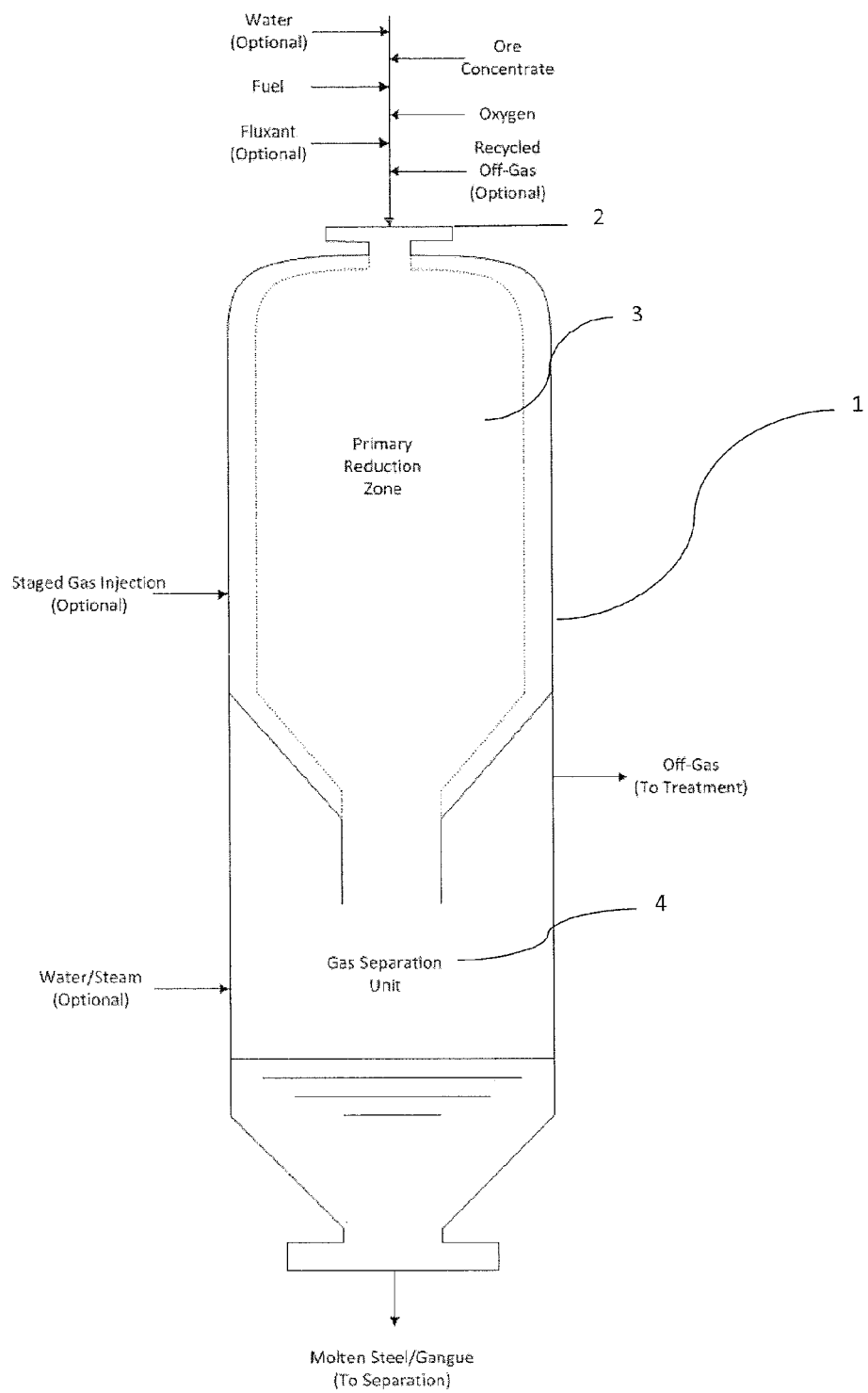
FIG. 1 is a schematic cross-sectional view of an illustrative embodiment of the metallization reactor vessel according to the present invention.

Examples of typical ore bodies that fit the system and method as described according to the present invention include iron, nickel, copper, tungsten, molybdenum, germanium and rhenium, although adjustments to reducing gas composition and operating conditions may allow for production of other metals as well. It is understood by a person skilled in the art that although the below description relates to iron, the same system and method can be applied to other metals.

The reductant chemistry for the metallization reactions is supplied by hydrocarbon fuels such as coal, gas or oil that are reacted with a sub-stoichiometric amount of oxygen so as to promote the formation of high fractions of the reducing gases CO and $H_2$ in a pressurized vessel.

Preferably, by using oxygen as opposed to air, the partial pressure will be maximized because the nitrogen will be eliminated from the reaction system.

According to one illustrative embodiment of the present invention, fine iron ore is injected directly into a furnace supplying the fluxing needs of the system. The very fast reaction rates as a result of the powerful reducing zones within this type of process cause the iron to metallize in flight and flow to the bottom of the reactor.

Optionally, fluxants such as limestone or dolomite may be added. The molten material is allowed to gather in a vessel under the slag tap from the primary reaction zone. The gathering vessel serves to: a) facilitate separation of the liquid metal and gangue phases, and b) allows for intermittent extraction of both the liquid metal and the gangue.

The system may be operated in a closed coupled configuration with a power system but may also be operated as a single iron making process.

The sizing requirements of various unit operations/equipment within a thermal process operation such as the furnace and air pollution control equipment are based upon residence time which varies inversely proportional to the volumetric flow through the device, where volumetric flow is inversely proportional to the density of the flue gas which varies directly with the pressure but is also influenced by the temperature through the system.

According to the present invention, residence times are much greater for high pressure systems when compared to those of ambient design; and equipment size, as a result of increased residence time, is reduced in size.

Within a blast furnace, coke is converted to a gas capable of reducing the iron oxides ($FeO$, $Fe_2O_3$, $Fe_3O_4$) to metallic iron typically called pig iron or hot metal in a liquid form which is periodically tapped from a blast furnace. This gas contains high partial pressures of $H_2$ and CO that form the major reductant species.

Oxy-firing increases partial pressure of reductant species by the elimination of nitrogen from the flue gases. The use of higher operating pressures results in a large increase in the partial pressure of reductant species that directly affects the rate of metal reduction.

Within the vessel, CO and $H_2$ are generated at high partial pressures. To further increase the reductant behaviour of the reducing gases, higher fractions of $H_2$ can be generated by the use of steam injection to promote the water shift reaction within the reaction chamber.

Referring first to FIG. 1, an illustrative embodiment of the "metallization reactor" 1 according to the present invention is shown. At the top of vertical reactor vessel, multiple reactants, including metal ore concentrate, oxygen, fuel, and optionally water, recycled off-gas, and/or fluxant, etc., are injected through a multiphase burner 2 through the top of the reactor.

Metallization reactor 1 is operated at a temperature of between 1000 and 2000° C.

The reduction reaction takes place in the primary reduction zone 3 at temperatures approximately 1500-2000° C., preferably at temperatures approximately 1550-1600° C.

The ash and molten iron melt, flow down through the primary reduction zone 3 and fall into the gas separation unit 4. The gas and molten material are separated through density differences, the molten materials are sent for separation of the ash/guangue/slag and molten iron. The gas can then undergo a shift reaction to increase the amount of hydrogen through injection of water using the water-gas shift reaction.

Metallization reactor 1 is operated under higher than atmospheric pressure.

Preferably, the metallization reactor is operated under pressure of 1-100 barg, more preferably 10-30 barg.

As a person skilled in the art would appreciate that at a certain point, the metallization reduction reactions will be limited by the reaction rate, which will in turn affect the upper limit of the operating pressure.

Generally, the oxygen introduced into metallization reactor 1 is at a purity of 90% or higher.

A person skilled in the art will understand that the ratios of the reactants will depend on the type of specific ores and the choice of fuel (i.e. natural gas, coal, oil, etc.).

According to the present invention, there are multiple "optional" streams for injection. Water, recycled off-gas and fluxant may be added to the burner to adjust both the solid and gas chemistry, staged gas injection may be added closer to the bottom of the reduction zone in order to assist in complete conversion or burnout carbon to produce higher grade steel.

Optionally, water ($H_2O$) may be added to the reaction zone to promote the water shift reaction and increase the hydrogen fraction which enhances reduction. It may be added as part of the ore slurry feed or the solid fuel slurry feed as shown in FIG. 1. Alternatively, it may be added independently to the metallization reactor for the sole purpose of enhancing the water shift reaction and increasing the fraction of hydrogen.

Optionally, the fuel, oxygen and the recycled off-gas to be injected to the reactor may be preheated.

Grinding of the iron ore concentrate took place prior to injection. Finely prepared iron ore concentrate (either dry or water slurried) are injected into the high pressure reduction zone of the metallization reactor with the fuel, oxygen and optionally water. This process as described may involve water from the various steps and black water can be used to slurry the iron oxides and the flux.

An optional flux consisting of an alkali material such as limestone or dolomite may be blended with the iron oxide prior to introduction to the metallization reactor. Fluxes reduce the detrimental effects of $SO_2$ within the metallization reactions thereby improving the reduction mechanisms. Fluxes tend to bind unwanted impurities (non-iron species) that originated from the fuel (in the form of ash) or from impurities in the iron ore feed. Once in the bath, the impurities, called gangue, covers the hot metal surface as it is removed from the vessel thus reducing the effect of re-oxidation of the surface of the metal as the settling vessel becomes exposed to the environment until it is cooled.

Figure 2:
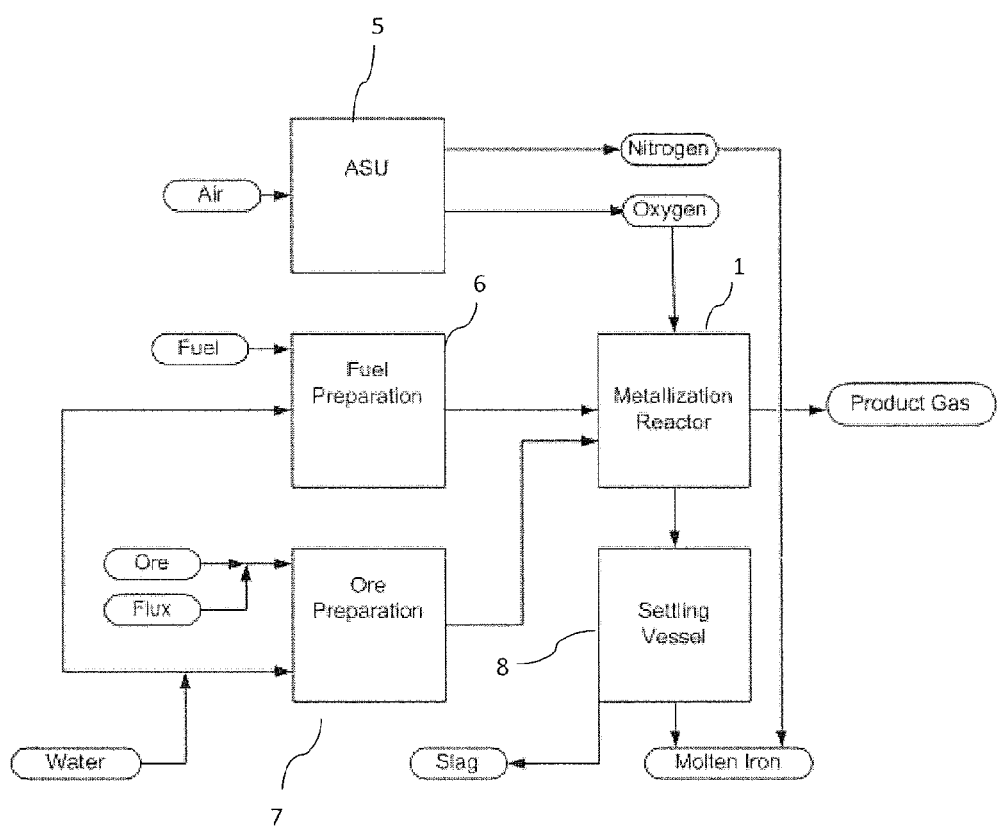
FIG. 2 is a schematic representation of an illustrative embodiment according to the present invention for the implementation of high pressure oxy-fired (HiPrOx) flash metallization process with solid fuel and water slurry feed.

FIG. 2 is a schematic representation of an illustrative embodiment according to the present invention for the implementation of high pressure oxy-fired (HiPrOx) flash metallization process with solid fuel and water slurry feed.

Referring to FIG. 2, air is passed through an air separation unit (ASU) 5 to be separated into oxygen and nitrogen at a specified purity. Fuel is passed through a fuel preparation unit 6 before being introduced into the metallization reactor 1. Fuel preparation may consist of grinding mills; and in some applications dryers may be required to reduce the moisture content prior to grinding. Ore is introduced into an ore preparation unit 7. Ore preparation consists of beneficiation mills to remove most of the impurities through grinding, washing and magnetic separation. The remaining material is combined with a fluxant (the specific fluxant used will depend on the ore chosen) prior to being introduced into the metallization reactor 1.

The metallization reactor 1 is continuously fed with oxygen, ore/fluxant mixture and a fuel (fuel and ore/flux may be slurried in order to achieve higher injection pressures or to increase the water content in the reactor for gas-water shift reaction promotion).

Molten metal exits the metallization reactor 1 from the bottom of the metallization reactor 1 and is sent to a settling vessel 8 where the molten iron and any impurities are separated through differences in density and liquid state properties.

Product gas is recovered from the metallization reactor 1 and may either be recycled or used for heating applications elsewhere in the facility. Nitrogen from the ASU 5 may be used for surface inerting of the molten iron exiting the settling vessel until it cools sufficiently to avoid re-oxidation.

Figure 3:
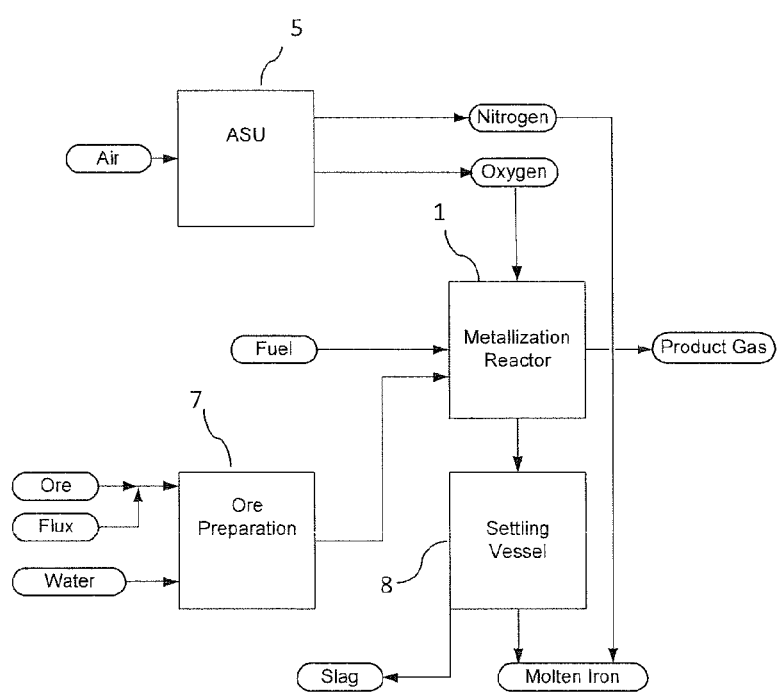
FIG. 3 is a schematic representation of an illustrative embodiment according to the present invention for the implementation of high pressure oxy-fired (HiPrOx) flash metallization process with gaseous or liquid fuels.

FIG. 3 is a schematic representation of an illustrative embodiment according to the present invention for the implementation of high pressure oxy-fired (HiPrOx) flash metallization process with gaseous or liquid fuels.

Referring to FIG. 3, air is passed through an air separation unit (ASU) 5 to be separated into oxygen and nitrogen at a specified purity. Preferably, this can be achieved through cryogenic distillation (can use Vacuum Swing Adsorption for lower than 1,000 ton/day applications). Fuel is introduced into the metallization reactor 1. Ore is introduced into an ore preparation unit 7. Ore preparation consists of beneficiation mills to remove most of the impurities through grinding, washing and magnetic separation. The remaining material is combined with a fluxant (the specific fluxant used will depend on the ore chosen) prior to being introduced into the metallization reactor 1.

The metallization reactor 1 is continuously fed with oxygen, ore/fluxant mixture and a liquid or gaseous fuel (ore/flux may be slurried in order to achieve higher injection pressures or to increase the water content in the reactor for gas-water shift reaction promotion).

Molten metal exits the metallization reactor 1 from the bottom of the metallization reactor 1 and is sent to a settling vessel 8 where the molten iron and any impurities are separated through differences in density and liquid state properties. As the settling vessel fills with molten iron, the vessel will be discharged into ladles for further processing. This may be carried out in batch or continuous modes of operation depending on the size of reactors, material throughput and the guangue content of the ore.

Product gas is recovered from the metallization reactor 1 and may either be recycled or used for heating applications elsewhere in the facility. Nitrogen from the ASU 5 may be used for surface inerting of the molten iron exiting the settling vessel until it cools sufficiently to avoid re-oxidation.

Nitrogen discharged from the ASU will be available to use in the hot metal discharge area to prevent hot metal oxidation as the metal cools. Rapid quenching with water can also be utilized in the metal discharge to prevent oxidation by rapid reduction of temperature causing a sudden phase shift from liquid to solid.

The flue gas at the discharge of the metallization reactor vessel contains mostly $CH_4$, $CO_2$, $H_2O$, $H_2$ and CO, and some minor amounts of contaminants that consist of higher chain hydrocarbons, nitrogen, argon, oxygen, $H_2S$, etc.

The product gas is useable as a fuel for either a combustion system such as a boiler, turbine or engine. It may also be used as a feedstock to a chemical process such as ammonia or methanol production.

Optionally, the product gas may be recycled to reduce fuel requirements and increase the partial pressure of $H_2$ and CO in the reduction zone of the reactor.

While this high pressure oxy-fired flash metallization (HiPrOx) technology is well suited to act as a stand-alone unit, it may also work synergistically with newer gasification and combustion system technologies, for example, in the area of high pressure gasification systems and combustion systems which may provide the opportunity to co-produce electricity, heat and/or chemicals with liquid metal iron in a common facility resulting in a substantial reduction in energy requirement and improved process efficiency.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A one pot process for in situ production of metal from metal oxide ore through reduction, comprising:
    (a) feeding a mixture of pulverized metal oxide ore, fuel, said fuel also acts as a reducing agent, and supply of oxygen into an inlet in a top of an entrained-flow metallization reactor;
    (b) heating the mixture of the pulverized metal oxide ore, the fuel and the supply of oxygen in a primary reduction zone in an upper portion of the entrained-flow metallization reactor wherein the reaction takes place in liquid phase in situ at a temperature between 1000 to 2000° C. and at a pressure exceeding ambient pressure to produce a product mixture containing liquid metal; and
    (c) separating the product mixture into a off-gas and the liquid metal in a gas separation unit at a bottom of the metallization reactor wherein the off-gas exits through a first outlet in a side of the gas separation unit and the liquid metal exits through a second outlet in a bottom of the metallization reactor,
    wherein steps (a), (b) and (c) take place within the one pot of the same single metallization reactor.

2. The process as claimed in claim 1, further comprising a step of injecting at least one of water, fluxant and recycled off-gas to the mixture of pulverized metal oxide ore, fuel and supply of oxygen into the inlet in the top of the entrained-flow metallization reactor during step (a).

3. The process as claimed in claim 2, wherein when the fluxant is used, the fluxant is alkali material.

4. The process as claimed in claim 3, wherein the fluxant is limestone or dolomite.

5. The process as claimed in claim 1, wherein the pressure of the metallization reactor in step (b) is at 1 to 100 barg.

6. The process as claimed in claim 1, wherein the fuel in step (a) comprises natural gas, coal, oil and/or hydrogen.

7. The process of claim 1, further comprising recovering the off-gas from the metallization reactor.

8. The process of claim 7, further comprising recycling or using the recovered off-gas to provide heat for the process.

9. The process as claimed in claim 1, wherein the reaction temperature of step (b) is between 1500 to 2000° C.

10. The process as claimed in claim 1, wherein the reaction temperature of step (b) is between 1550 to 1600° C.

11. The process as claimed in claim 1, wherein the pressure of the metallization reactor in step (b) is at 10-30 barg.

12. The process as claimed in claim 1, further comprising injecting a staged gas in an inlet in a side of the primary reduction zone.

13. The process as claimed in claim 1, further comprising injecting water or steam or a combination thereof in an inlet in the side of the gas separation unit.

14. A one pot process for in situ production of metal from metal oxide ore through reduction, comprising:
  (a) feeding a mixture of pulverized metal oxide ore, fuel, said fuel also acts as a reducing agent, and supply of oxygen into an inlet in a top of an entrained-flow metallization reactor;
  (b) heating the mixture of the pulverized metal oxide ore, the fuel and the supply of oxygen in a primary reduction zone in an upper portion of the entrained-flow metallization reactor wherein the reaction takes place in liquid phase in situ at a temperature between 1500 to 2000° C. and at a pressure of 10-30 barg to produce a product mixture containing liquid metal; and
  (c) separating the product mixture into a off-gas and the liquid metal in a gas separation unit at a bottom of the metallization reactor wherein the off-gas exits through a first outlet in a side of the gas separation unit and the liquid metal exits through a second outlet in a bottom of the metallization reactor,
  wherein steps (a), (b) and (c) take place within the one pot of the same single metallization reactor.

15. The process as claimed in claim 14, further comprising a step of injecting at least one of water, fluxant and recycled off-gas to the mixture of pulverized metal oxide ore, fuel and supply of oxygen into the inlet in the top of the entrained-flow metallization reactor during step (a).

16. The process as claimed in claim 15, wherein when the fluxant is used, the fluxant is alkali material.

17. The process as claimed in claim 16, wherein the fluxant is limestone or dolomite.

18. The process as claimed in claim 14, wherein the fuel in step (a) comprises natural gas, coal, oil and/or hydrogen.

19. The process as claimed in claim 14, further comprising injecting a staged gas in an inlet in a side of the primary reduction zone.

20. The process as claimed in claim 14, further comprising injecting water or steam or a combination thereof in an inlet in the side of the gas separation unit.

* * * * *